United States Patent [19]

Dawson et al.

[11] 4,323,850

[45] Apr. 6, 1982

[54] MEASUREMENT OF ARTICLES

[75] Inventors: Peter Dawson, Bingley; John H. Phillips, Cheadle Hulme, both of England

[73] Assignee: Kelvin Lenses Limited, Denton, England

[21] Appl. No.: 94,467

[22] Filed: Nov. 15, 1979

[30] Foreign Application Priority Data

Nov. 17, 1978 [GB] United Kingdom ............... 44911/78

[51] Int. Cl.$^3$ ......................... G01N 27/07; G01B 7/28
[52] U.S. Cl. ................................. 324/439; 33/174 A; 33/200; 324/65 R
[58] Field of Search ........................... 324/439, 65 R; 33/174 A, 169 B, 200

[56] References Cited

U.S. PATENT DOCUMENTS 4,205,452 6/1980 Wichterle et al. ................ 33/174 A
4,212,107 7/1980 Mezzasalma ..................... 33/174 A Primary Examiner—Ernest F. Karlsen
Attorney, Agent, or Firm—Fleit & Jacobson

[57] ABSTRACT

In order to measure, for example, the radius of curvature of a soft contact lens, the lens is mounted in a bath of the electrolyte and supported at its periphery on a tubular support. A probe movable along an axis has two electrodes mounted on it and the resistance or impedance between those electrodes and the mount is monitored; when the difference in these resistances or impedances equals a predetermined value, the probe is taken as being a predetermined distance from the lens and the position of the probe relative to the mount is measured by a transducer arrangement. The output from the transducer is converted to digital form and used to address a read-only-memory in which are stored values correlating the position of the probe along the axis with the radius of curvature of the lens.

19 Claims, 3 Drawing Figures

MEASUREMENT OF ARTICLES

DESCRIPTION

The invention relates to the measurement of articles, and more particularly, but not exclusively to measuring the radius of curvature of a hydrophilic plastics contact lens.

Soft contact lenses are made from a plastic material which absorbs tear fluid (a hydrophilic plastic) and hence carries dissolved oxygen to the cornea of the eye. They are made by a similar turning and polishing process as is a hard lens, but on immersion in water or saline solution, the plastic absorbs the fluid and swells. The lens is thus soft and pliable in use.

A common problem faced by all soft lens manufacturers is the measurement of the surface shape of a lens when it is freely suspended in fluid. There are only two optical methods of doing this at present, but both are slow, inaccurate and need skilled operators.

Our method uses the conductive properties of the saline solution to determine when a probe is in a predetermined position relative to the surface of the lens.

Our invention is applicable to the measurement of the internal radius of curvature of a hydrophilic plastics lens as well as to the measurement of other articles.

According to a first aspect of this invention we provide apparatus for measuring an article comprising a mount for holding the article in a bath of electrolyte, a probe movable along one axis relative to said mount, means for measuring the position of the probe along said axis and means for detecting and indicating when, during movement of the probe along said axis, the probe occupies a predetermined position relative to the article on the mount on the basis of the electrical resistance or impedance between the probe and a reference electrode in the bath.

A second aspect of the present invention provides a method of measuring an article using a probe comprising the steps of moving the probe towards the article along an axis while detecting the electrical resistance or impedance between the probe and a fixed reference electrode, until this resistance or impedance indicates that the probe is at a predetermined distance from the article and then measuring the position of the probe along said axis.

Preferably, two electrodes are mounted on the probe in an assymmetric configuration and the detecting means is arranged to sense when the difference in the electrical resistances or impedances between each of these electrodes and the reference electrode lies in a predetermined range of values. In one embodiment an electrical position transducer is associated with the probe to produce an output signal indicating the position of the probe along the axis and a value corresponding to this output signal is displayed when the detecting means indicates that the probe is in the predetermined position relative to the article on the mount. Prior to being displayed, or in the display itself, the output signal may be converted so that the displayed value equals some physical dimension of the article, e.g. a radius of curvature in the case of the article being a lens.

The measuring probe preferably has the two electrodes disposed so that one is nearer the article than is the other. Suitably the impedance to an alternating signal is monitored between each conductor and the mount which is electrically conductive so as to serve as the reference electrode. While the probe is remote from the sample, the two impedances remain substantially constant regardless of position. When the probe approaches the sample, the impedance measured by the leading electrode changes with respect to that measured by the other and this change occurs before the probe touches the sample.

The invention will be further described with reference to the accompanying drawings, in which.

Figure 1:
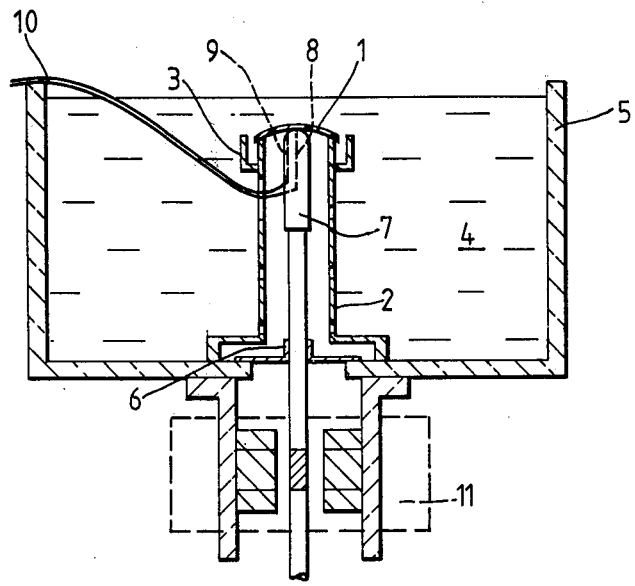
FIG. 1 shows schematically and in cross-section part of one embodiment of the invention.
Figure 2:
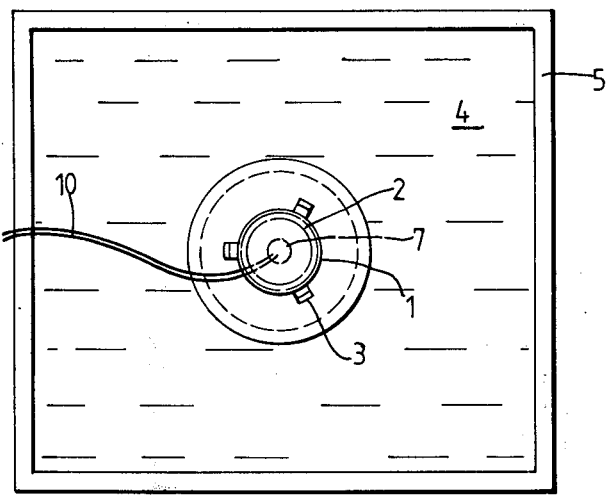
FIG. 2 is a plan view corresponding to FIG. 1.

In FIG. 1, the sample 1, a hydrophilic plastic contact lens, is placed concave side downwards upon a mount in the form of a tubular support 2, its location being assisted by means of lugs on a collar 3 forming part of support 2. The support 2 is located in a transparent housing 5 containing a electrolyte 4 and mounted coaxially with the support 2 is a probe 7 which is constrained so as to be movable up and down along the axis of tube 2. A flexible seal 6 allows this vertical movement of the probe 7 to take place without leakage of the electrolyte 4. Probe 7 is of insulating material and has mounted asymmetrically on it two electrodes, namely a forward conductor 8 and trailing conductor 9 which are sealed into probe 7 such that their tips are ground flush with the surface of probe 7. The conductors are of a precious metal to avoid corrosion. Insulated wires 10 are taken through a vertical slot in support 2 to the remainder of the circuitry shown in FIG. 3.

The probe is rigidly connected to a measuring transducer 11 which produces an electrical output proportional to the vertical position of the probe 7 relative to the support 2 and housing 5.

In use, the probe is first retracted downwardly clear of the upper end of support 2.

The sample 1, a hydrophilic plastics contact lens, is placed upon the upper end of support 2 and the probe 7 caused to rise vertically. The electrolyte within the support 2 displaced by the flexible seal 6 is allowed to dissipate through holes bored in the support so as to avoid disturbing the lens. Most suitably these holes include a row of holes just below the end of the support.

Figure 3:
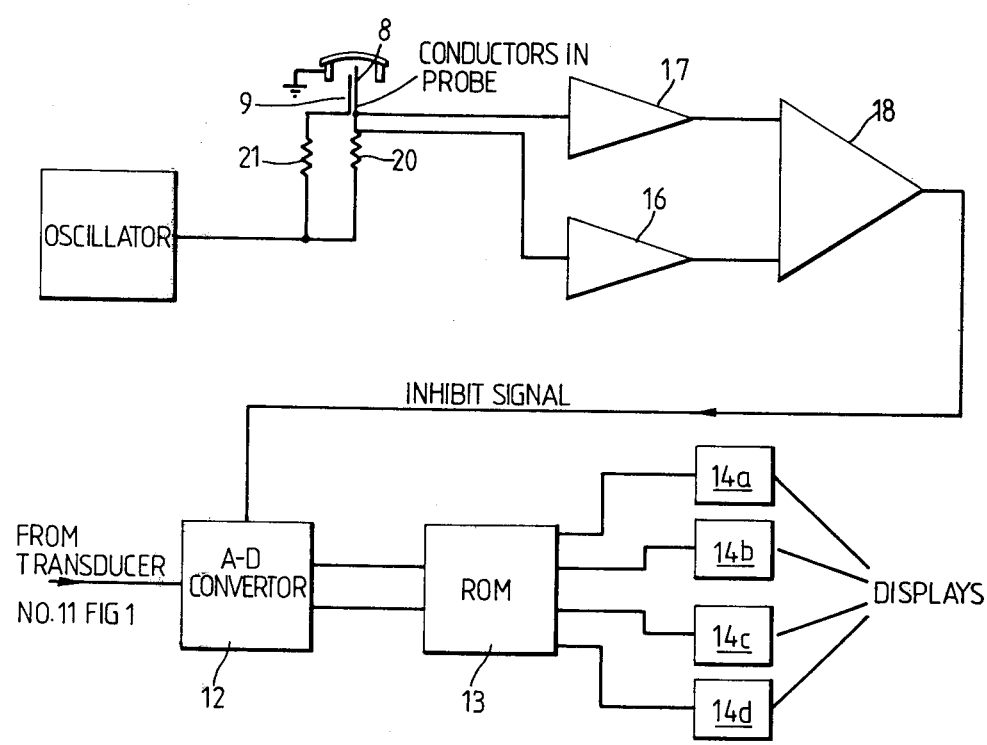
FIG. 3 is a circuit diagram of the apparatus of FIG. 1.

The probe rises and as it approaches the sample, the electrical impedance between each conductor 8, 9 and the support 2 are monitored by the circuit of FIG. 3. To start with they are approximately equal as each is a relatively long way from the lens 1. As they approach the lens, its presence starts to influence the impedance between forward conductor 8 and the support before it starts to influence the impedance between the trailing conductor 9 and the suppport 2. Thus the ratio of these impedances varies as the probe approaches the sample and when a predetermined difference in impedance is reached, the position of the probe 7 as monitored by transducer 11 is measured.

If the sample is in the form of a lens with concave side towards the probe or some other regular shape, the displacement of the probe as measured by transducer 11 can be related to a relevant dimension of the sample such as the internal radius of curvature in the example given.

The analogue electrical output of the transducer 11 is converted to digital form by analogue to digital 12 converter and the digital word so produced is used to address an electronic read-only memory 13.

The read-only memory 13 is pre-programmed so that for each input indicating the displacement being measured by transducer 11 at that point it produces as an output the corresponding measurement value, i.e. in this case the corresponding radius of curvature of the lens. This value is displayed digitally by displays 14a–14d, each increment of position selecting a different address of, and thus producing a different result from, the read-only memory 13.

The conductors 8, 9 in the probe have applied thereto an alternating signal from an oscillator 15 via resistors 20, 21 so that the voltages at the voltages at the conductors are related to the impedances between the conductors and support 2. The signal is at a low level in order to prevent electrolysis of the electrolyte. The signals from the conductors 8, 9 are amplified by respective amplifiers 16 and 17, and the circuit is arranged such that with no lens present, equal signals appear at their outputs. These outputs are subtracted one from another and the difference compared with a reference level by comparator 18, the arrangement being such that the signal present at the output of a comparator 18 inhibits analogue to digital conversion by the converter 12 operating until the difference in impedances exceeds a predetermined value, indicating that the probe is a predetermined distance from the lens. When the probe assembly reaches the vicinity of the lens 1, the converter 12 is allowed to produce a digital word which addresses the read-only memory 13 and thus causes the displays to indicate the internal radius of curvature of the lens 1.

The use of a mounting ring support as described above allows the pressure above and below the sample to equalise thus avoiding the sample floating off its mount when the probe moves.

The use of the electrolytic bath enables the lens to be maintained at a constant temperature to avoid inaccuracy in position measurement and change of dimensions of the lens.

We claim:

1. Apparatus for measuring an article comprising a mount for holding the article in a bath of electrolyte, a probe movable along one axis relative to said mount, a reference electrode, in use located in the bath, means for measuring the position of the probe along said axis and means for detecting and indicating when, during movement of the probe along said axis, the probe occupies a predetermined spaced position relative to the article on the mount on the basis of the electrical resistance or impedance between the probe and the reference electrode in the bath, thereby enabling the article to be measured without contact between the article and the probe.

2. An apparatus according to claim 1 wherein the mount is tubular and said axis extends longitudinally of the mount.

3. Apparatus according to claim 1 or 2 wherein the mount constitutes the reference electrode.

4. Apparatus according to claim 1 wherein the wall of the mount is perforated to allow electrolyte displaced by the probe to exit the mount without disturbing the article.

5. Apparatus according to claim 1 wherein said measuring means comprises a transducer coupled to the probe to detect its position relative to the mount.

6. Apparatus according to claim 5 wherein the arrangement is such that an output is derived from the transducer indicating a measurement of the article when the detecting and indicating means indicates that the probe is in a predetermined position relative to the article on the mount.

7. Apparatus according to claim 1 and including an analogue to digital converter for producing a digital signal representing the detected position of the probe.

8. Apparatus according to claim 7 and including a read-only-memory operative to produce a digital signal dependent on the digital signal from the analogue to digital converter and indicating the value of the measurement of the article.

9. Apparatus according to claim 1 wherein there is a pair of electrodes mounted on said probe.

10. Apparatus according to claim 9 wherein said electrodes are asymmetrically placed on the probe.

11. Apparatus according to claim 9 including means for producing a signal representative of the difference in resistance or impedance from each of said electrodes to the reference electrode and means for producing a further signal indicating when said difference indicates that the probe is in said predetermined position relative to said article.

12. A method of measuring an article using a probe comprising the steps of moving the probe towards the article along an axis while detecting the electrical resistance or impedance between the probe and a fixed reference electrode, until this resistance or impedance indicates that the probe is spaced a predetermined distance from the article and then measuring the position of the probe along said axis whereby the article is measured without contact thereof with the probe.

13. A method according to claim 12 wherein the article is placed in a bath of electrolyte during the measurement.

14. A method according to claim 12 or 13 wherein the article is a soft contact lens, the measurement being a measurement of its radius of curvature.

15. A method according to claim 12 wherein the fact that the probe is at a predetermined distance from the article is detected by monitoring the difference in electrical resistance or impedance from two electrodes mounted on the probe to a reference electrode.

16. Apparatus for measuring an article comprising a mount for holding the article in a bath of electrolyte, a probe movable along one axis relative to said mount, the mount being perforated to allow electrolyte displaced by the probe to exit the mount without disturbing the article, a reference electrode, in use located in the bath, means for measuring the position of the probe along said axis and means for detecting and indicating when, during movement of the probe along said axis, the probe occupies a predetermined position relative to the article on the mount on the basis of the electrical resistance or impedance between the probe and the reference electrode in the bath.

17. Apparatus for measuring an article comprising: a mount for holding the article in a bath of electrolyte; a probe movable along one axis relative to said mount; a reference electrode; means for measuring the position of the probe along said axis, including a transducer coupled to the probe to detect its position relative to the mount; and means for detecting and indicating when, during movement of the probe along said axis, the probe occupies a predetermined position relative to the article on the mount on the basis of the electrical resistance or impedance between the probe and the reference electrode in the bath.

18. Apparatus for measuring an article comprising: a mount for holding the article in a bath of electrolyte; a reference electrode, in use located in the bath; a probe movable along one axis relative to said mount; means for measuring the position of the probe along said axis, including a transducer for detecting the position of the probe relative to the mount; and means for detecting and indicating when, during movement of the probe along said axis, the probe occupies a predetermined position relative to the article on the mount on the basis of the electrical resistance or impedance between the probe and the reference electrode in the bath; the arrangement being such that an output is derived from the transducer indicating a measurement of the article when the detecting and indicating means indicates that the probe is in a predetermined position relative to the article on the mount.

19. Apparatus for measuring an article comprising: a mount for holding the article in a bath of electrolyte; a reference electrode, in use located in the bath; a probe movable along one axis relative to said mount and having two further electrodes thereon; means for measuring the position of the probe along said axis; means for producing a first signal representative of the difference in resistance or impedance from each of said further electrodes to the reference electrode; and means for producing from the first signal a further signal indicating when said difference indicates that the probe is in a predetermined position relative to said article.

* * * * *